United States Patent [19]
Yehl et al.

[11] Patent Number: 5,624,344
[45] Date of Patent: Apr. 29, 1997

[54] LUBRICATION SYSTEM FOR A PARALLEL-AXIS DIFFERENTIAL

[75] Inventors: Patrick J. Yehl; Mark W. Damick, both of Rochester, N.Y.

[73] Assignee: Zexel Torsen Inc., Rochester, N.Y.

[21] Appl. No.: 432,960

[22] Filed: May 1, 1995

[51] Int. Cl.⁶ .............................. F16H 57/04; F01M 1/00
[52] U.S. Cl. .......................... 475/160; 475/159; 184/6.12
[58] Field of Search .................................... 475/159, 160; 184/6.12; 74/476

[56] References Cited

U.S. PATENT DOCUMENTS

| | | | |
|---|---|---|---|
| 3,444,960 | 5/1969 | Killius et al. | 475/160 X |
| 4,724,721 | 2/1988 | Gleasman et al. | 475/160 |
| 5,415,601 | 5/1995 | Cilano | 475/160 |
| 5,456,642 | 10/1995 | Frost | 475/159 X |

FOREIGN PATENT DOCUMENTS 137766  8/1982  Japan .................. 475/160

Primary Examiner—Khoi Q. Ta
Attorney, Agent, or Firm—Eugene Stephens & Associates

[57] ABSTRACT

The disclosed system facilitates the flow of lubrication fluid between the planet gears and their respective housing pockets in a parallel-axis differential. A further set of pockets is formed within the differential housing for receiving and retaining lubrication fluid that is continuously supplied to the housing during vehicle operation. Holes, slots, and grooves direct the lubrication from the fluid-storage pockets to (a) the cylindrical bearing surfaces of the pockets and to (b) the interfaces between the planet-gear pockets and the end faces of their respective planet gears. The fluid-storage pockets are distributed circumferentially about the common axis of the side gears so that the rotational balance of the differential is maintained. The shape and position of the fluid-storage pockets are selected to assure that, in every relative rotational orientation of the housing, at least one of the fluid-storage pockets retains lubricating fluid during those times when the housing is not rotating, thereby assuring adequate differential lubrication upon startup.

30 Claims, 6 Drawing Sheets

5,624,344

LUBRICATION SYSTEM FOR A PARALLEL-AXIS DIFFERENTIAL

TECHNICAL FIELD

The invention relates to automotive differentials of the "parallel-axis" type and, more particularly, to the lubrication of the differential's planetary gear arrangements that are mounted in pockets formed in the differential housing.

BACKGROUND OF INVENTION

Gear differentials include compound planetary gear sets carried within a differential housing interconnecting a pair of output shafts for opposite directions of rotation with respect to the housing. An input shaft is connected to the housing for rotating the housing about a common axis of the output shafts. Sun gear members of the respective planetary gear sets, also referred to as "side" gears, are coupled to inner ends of the output shafts. Planet gear members of the planetary gear sets operatively connect the two side gears in a mutual driving relationship for relative rotation in opposite directions.

One known arrangement of such planetary gearing positions the side and planet gears within the housing for rotation about axes that extend parallel to each other. Differentials with this type of gearing arrangement are referred to as "parallel-axis" gear differentials. The planet gears of this type of differential are generally mounted in pairs within the differential housing. Preferably, the planet and side gears are provided with helical teeth; and one portion of each planet gear meshes with one of the side gears, while another portion of each planet gear meshes with its paired planet gear.

The invention herein relates to known designs of parallel-axis differentials in which the planet gears are individually supported for rotation within pockets formed in the housing. The planet gear pockets are shaped to mate with and provide (a) bearings for supporting the cylindrical outside diameter surfaces of the planet gears as well as (b) pocket end portions that act as thrust surfaces against which the end faces of the planet gears interact in response to the axial forces created when the helical teeth of the gearing are under load. The frictional resistance which results between the planet gears and their respective pockets is used to augment the desired "torque bias" of the differential. However, this same frictional resistance must be constantly controlled by adequate lubrication in order to avoid undesirable wear problems, and the relatively tight tolerances between the planet gears and their pockets make lubrication of their respective mating surfaces quite difficult.

Inadequate lubrication is a particular problem at those times when the vehicle has been parked or standing for an extended period just prior to the required operation of the differential. When parked or standing, lubrication drains away from the interfaces between the planetary gearing and the housing, and adequate lubricating fluid is usually not restored to these interfaces until some appreciable time after the vehicle is moving again. Therefore, differentiation at such times can cause excessive wear to the dry surfaces of these interfaces, particularly if the planetary gearing is subjected to relatively high loads. For instance, such high-torque loads occur when relatively high engine power is used at lower speeds, e.g., when accelerating a vehicle from a stopped condition and when turning sharply to leave a parking place.

The disclosed invention is specifically directed to overcoming such lubrication problems. In this regard, Japanese Application 300080110 (recently filed by the assignee of this application) discloses a multi-grooved washer specially designed for use in parallel-axis differentials, and a variation of that specially-designed washer is incorporated in preferred embodiments of our invention.

SUMMARY OF THE INVENTION

The disclosed invention is a lubricating system that improves parallel-axis differentials by (i) facilitating the flow of lubrication fluid between the housing and the planetary gearing, particularly between the planet gears and their respective pockets, and by (ii) assuring an adequate supply of lubricating fluid is present at all times within the differential.

Our invention accomplishes such lubrication improvement by forming within the differential housing a second set of pockets for receiving and retaining lubrication fluid that is continuously supplied to the housing during vehicle operation. The lubrication is supplied through a first passageway, preferably formed in one of the output shafts; and it is delivered to the second set of pockets, i.e., to the fluid-storage pockets, by a second passageway. Holes, slots, and grooves are formed in the housing to act as pathways for directing the lubrication from the fluid-storage pockets to (a) the cylindrical bearing surfaces of the pockets that support the planet gears, i.e., to the planet-gear pockets, and to (b) the interfaces between the planet-gear pockets and the end faces of their respective planet gears.

Special washers, positioned between the side gears and the housing, are formed with radial grooves that serve as part of the second passageway used to deliver lubricant to the fluid-storage pockets. These same washers include additional grooves which are used to control the frictional resistance generated between the housing and the end faces of the side gears. These special washers are designed in the manner disclosed in the Japanese application identified above.

In our parallel-axis differentials, both the planet-gear pockets and our fluid-storage pockets are positioned circumferentially about the common axis of the side gears so that, as the pockets are filled with lubricating fluid under the centrifugal forces created as the differential housing is rotated during vehicle operation, the rotational balance of the differential is maintained. The shape and position of the fluid-storage pockets are selected to assure that, in every relative rotational orientation of the housing, at least one of the fluid-storage pockets retains lubricating fluid during those times when the housing is not rotating. Therefore, regardless of the relative orientation of the housing when the vehicle is stopped, sufficient lubrication fluid is retained in at least one of the fluid-storage pockets to assure adequate lubrication upon startup, no matter how long the vehicle may have been standing prior to startup.

DRAWINGS

FIG. 1 is a longitudinal sectional view of a parallel-axis gear differential modified according to a preferred embodiment of the invention.

FIG. 2 is a sectional view of the housing shown in FIG. 1, taken along the plane A—A, showing the invention's fluid-storage pockets and indicating the level of lubricating fluid retained in the fluid-storage pockets when the differential housing has remained standing for an appreciable time in the rotational orientation shown; and FIG. 2B is the same differential as shown in FIG. 2A, under the same conditions, except that the orientation of the housing has been rotated approximately 70° clockwise.

DETAILED DESCRIPTION

Figure 1:
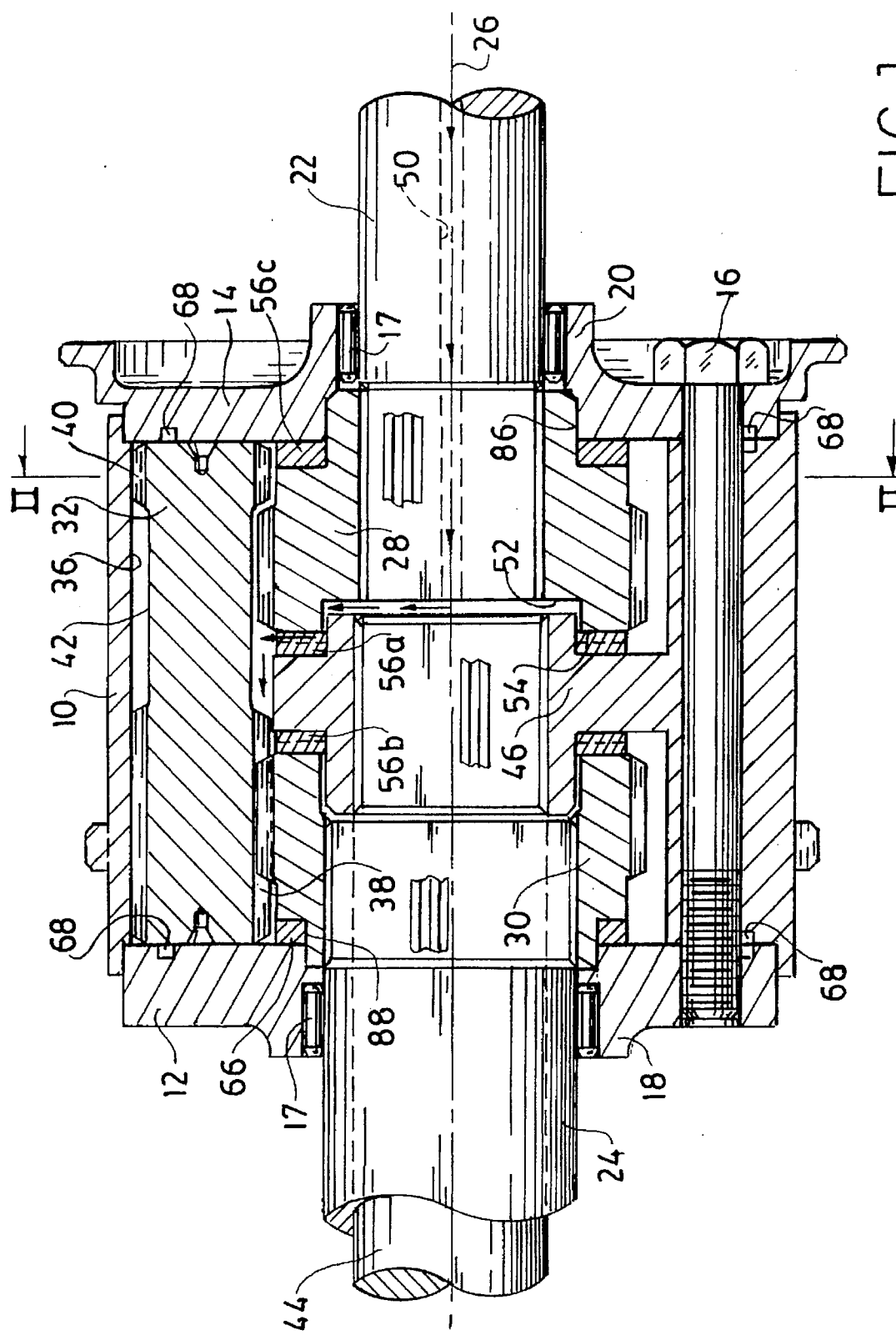
Figure 2A:
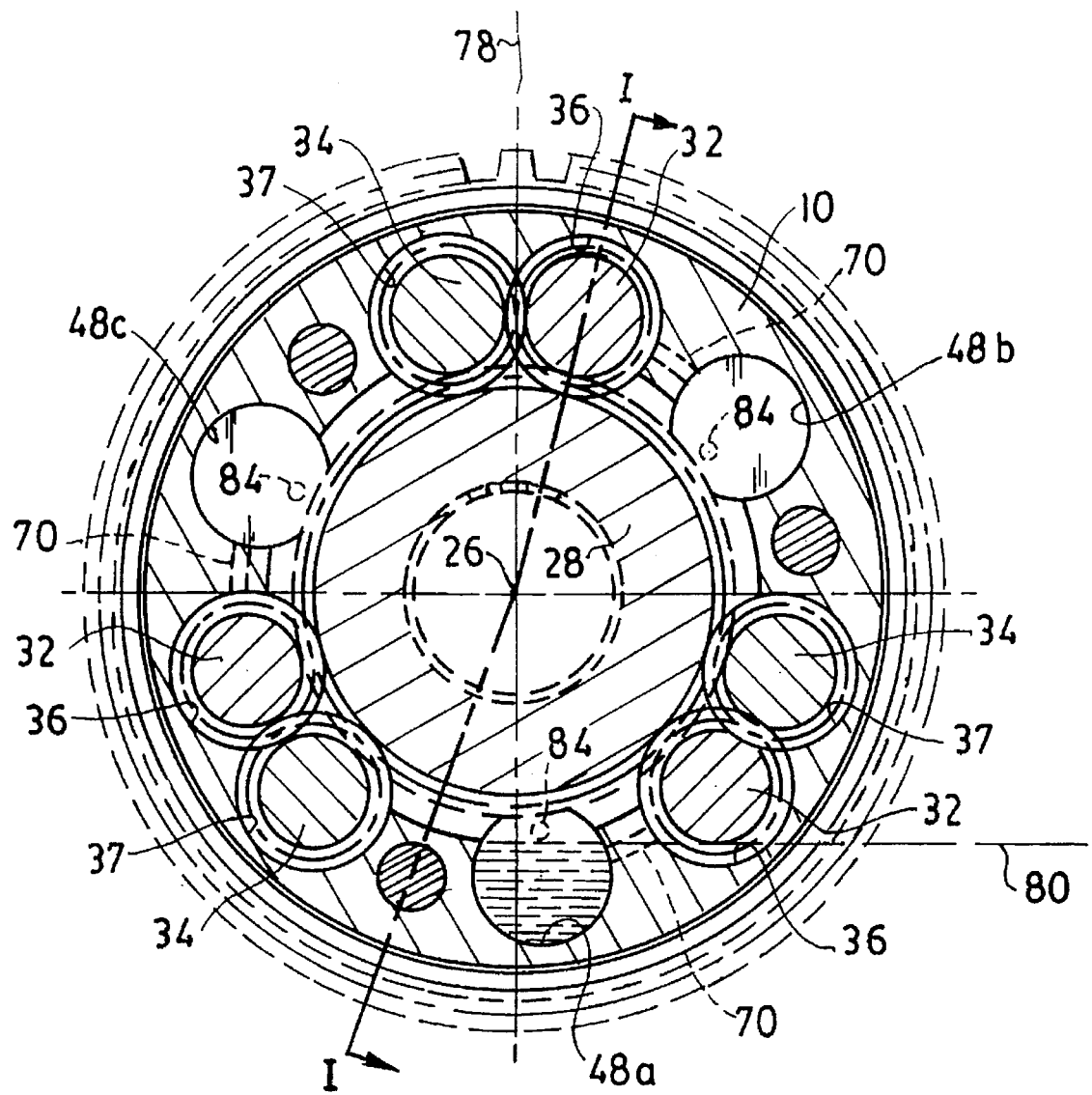

In the preferred embodiment of the invention illustrated in FIGS. 1 and 2A, a parallel-axis differential has a housing comprising a main body 10 and two end caps 12, 14, which are suitably attached together by bolts 16. (The view in FIG. 2A is taken along the line A—A in FIG. 1, and the view in FIG. 1 is taken along the line B—B in FIG. 2A.) Bearings 17 mounted within the openings formed in respective trunnions 18, 20 support the housing for rotation about respective first and second output shafts 22, 24 which share common axis 26.

A planetary gear arrangement is carried within main body 10 of the housing, namely, first side gear 28 and second side gear 30 are splined to the respective inner ends of first output shaft 22 and second output shaft 24. Planet gears 32, 34 are mounted in three respective pairs of planet-gear pockets 36, 37. Each planet gear 32 is in mesh with second side gear 30, while each planet gear 34 is in mesh with first side gear 28. Each pair of side gears 32, 34 is in mesh with each other at two separated engagement portions 38, 40 that straddle the areas at which planet gears 32, 34 are in mesh with their respective side gears. Each side gear 32, 34 also includes a narrowed shank portion 42 which provides clearance for the area in which its paired planet gear is in mesh with the paired planet gear's respective side gear. This planetary gearing arrangement interconnects first side gear 28 and second side gear 30 in a mutual driving relationship permitting relative rotation of the side gears in opposite directions.

This illustrated embodiment of the invention is a center-drive design in which the housing is rotated by an input shaft 44 that extends through second output shaft 24 and is splined for rotation with housing extension 46 which is formed as an integral part of main body 10.

A set of fluid-storage pockets 48a, 48b, and 48c, which are located symmetrically within main body 10 and equiangularly about common axis 26, extends axially parallel to common axis 26 and is positioned symmetrically between the pairs of planet-gear pockets 36, 37. Fluid-storage pockets 48 (not shown in FIG. 1) are used to store lubricating fluid, being sealed off at each end by respective housing end caps 12, 14.

Lubricating fluid is delivered to fluid-storage pockets 48 in the following manner: a first passageway, in the form of bore 50 formed through first output shaft 22, delivers lubricating fluid under pressure from an appropriate sump/reservoir (not shown). This first passageway connects with a second passageway that is formed within the differential by a relieved area 52 intentionally left between the inner end face of first output shaft 22 and the inner end face of input shaft 44. This second passageway continues in a space left between a relieved area, formed on the inner end face of first side gear 28, and housing extension 46 to which input shaft 44 is splined. Finally, the lubricating fluid delivered to fluid-storage pockets 48 passes between a thrust surface 54 of the inner end face of first side gear 28 and the end surface of a washer 56a. This latter portion of the second passageway is more clearly defined in the following description of washers 56a, 56b, and 56c.

Figure 4A:
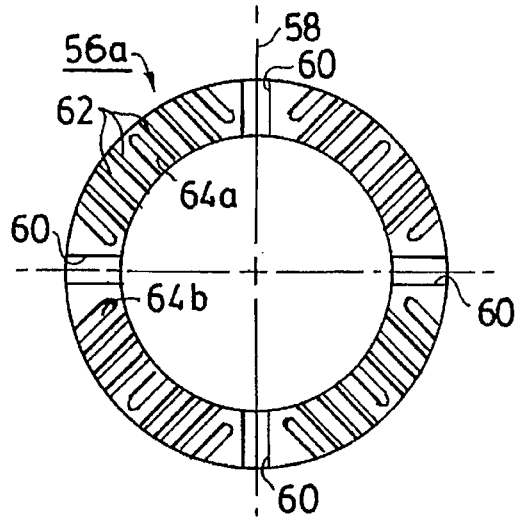
FIGS. 4A and 4B are two opposite end views of a washer incorporated in the preferred embodiments of our invention, showing the grooving of the respective end surfaces.
Figure 4B:
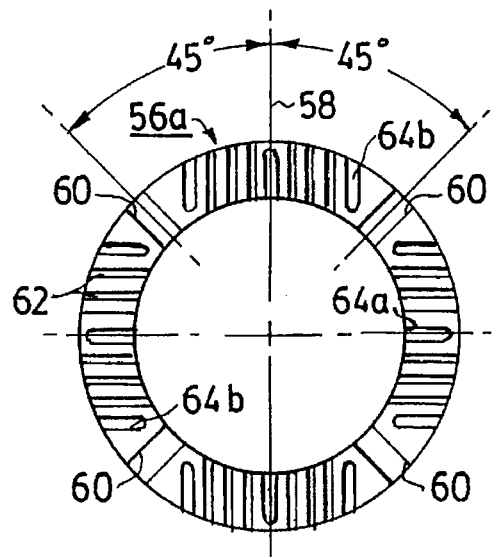

In FIGS. 4A and 4B, the two respective end surfaces of washer 56a are shown, the view in FIG. 4B having been rotated 180° about axis 58 from the view of the same washer shown in FIG. 4A. Each end surface of washer 56a includes four radial grooves 60 formed radially, across the entire width of the end surfaces of washer 56a, and oriented at 90° from each other. The set of radial grooves 60 formed on one end surface of washer 56a is offset by 45° from the set of radial grooves 60 formed on its opposite end surface.

Three other designs of secondary grooves are also arranged on each end surface of washer 56a: namely, sets of thru-grooves 62 which also extend across the entire width of the end surface, and two sets of closed-end grooves 64a and 64b which are formed across the entire width of each end surface except that one end of each groove 64a or 64b is closed to prevent a through passageway for lubricating fluid. Grooves 64a are closed at the outer circumference of the washer, while grooves 64b are closed at the inner circumference of the washer.

Radial grooves 60 are considerably larger than secondary grooves 62, 64. For instance, in a washer having an outside diameter of 54 mm (2.2") the larger radial grooves 60 would each have a width of approximately 5 mm (0.2") and a depth of 1.5 mm (0.06"), while the small thru-grooves are only 1 mm (0.04") wide and 0.35 mm (0.015") deep, the closed end grooves having widths of 2 mm (0.08") and a depth of 1 mm (0.04").

Radial grooves 60 permit a substantial flow of lubricating fluid to move past washer 56a to fill fluid-storage pockets 48a, 48b, and 48c. Closed-end grooves 64a act as a plurality of "cups" which retain lubrication between the washer and the thrust surfaces of first side gear 28 and housing extension 46. Thru-grooves 62 are provided to control friction by cutting or breaking the film of lubricating fluid which forms between the relatively sliding surfaces of washer 56a and first side gear 28 and housing extension 46. Closed-end grooves 64b serve to carry away excess lubricating fluid, splashing it outwardly under centrifugal forces.

Washers 56b and 56c, which are positioned, respectively, against the inner thrust surface of second side gear 30 and the outer thrust surface of first side gear 28, are identical with just-described washer 56a. A fourth washer 66, similar in general design to the washers 56, is positioned between housing end cap 12 and the thrust-receiving portion of the outer end face of second side gear 30.

In another feature of our invention, lubrication of second output shaft 24 and second side gear 30 is supplemented by a third fluid passageway that is formed in the splined engagement between input shaft 44 and housing extension 46. Preferably, three of the splines that form a portion of the splined interior of housing extension 46 are removed to leave three equiangularly positioned openings for conducting some of the lubricant emanating from bore 50 in first output shaft 22 to the clearance area shown between the inner end face of second output shaft 24 and housing extension 46. This third passageway also includes radial grooves 60 of washer 56b through which this supplemental lubrication is delivered to the bearing surfaces in the large central housing pocket supporting second side gear 30.

Figure 3A:
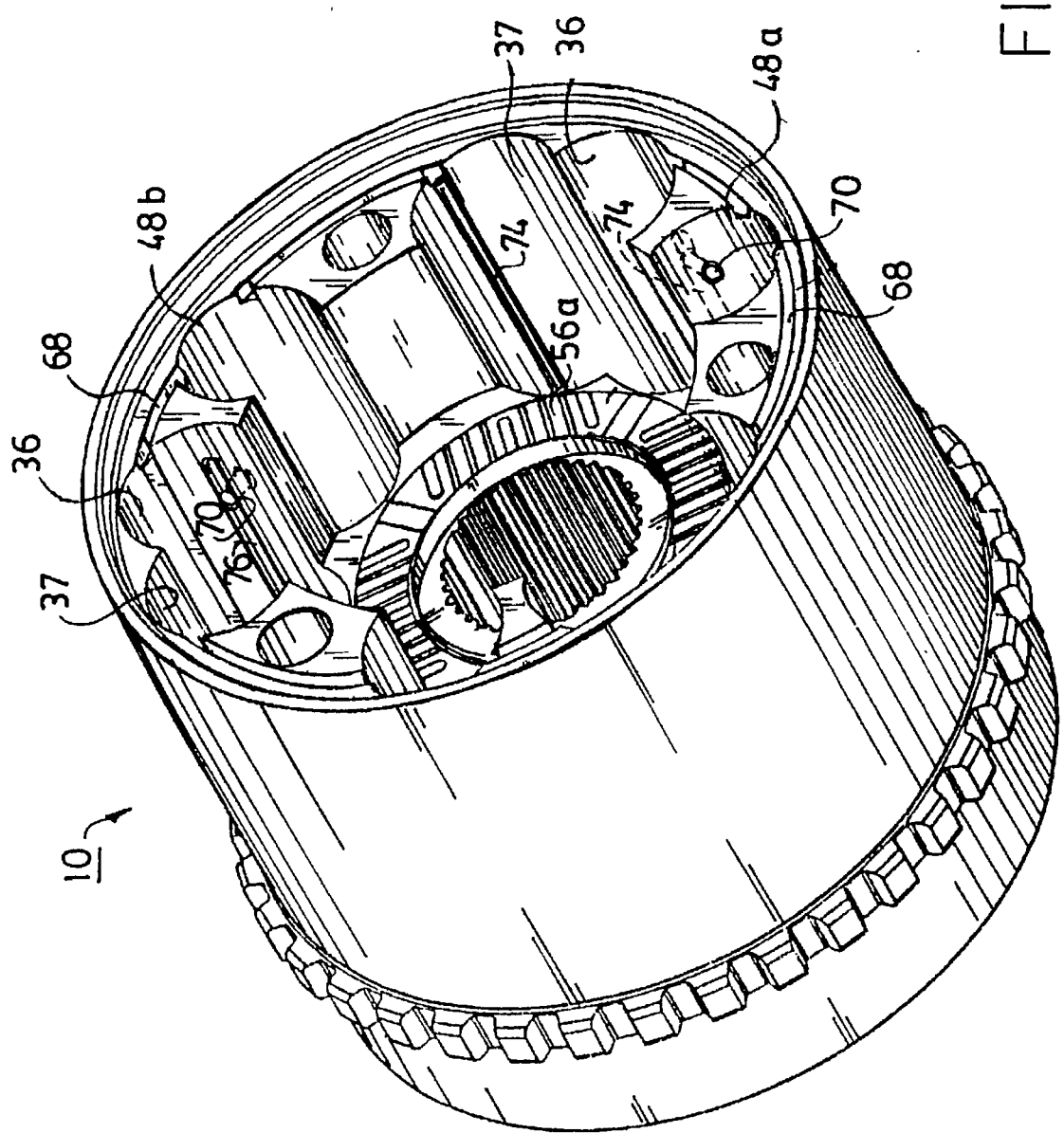
FIGS. 3A and 3B are two perspective views of the differential housing of FIGS. 1, 2A, and 2B with the planetary gearing omitted, but including washers positioned at the respective inner ends of each side gear, to show the pathways provided to deliver lubrication fluid to the bearing surfaces of planet-gear pockets.
Figure 3B:
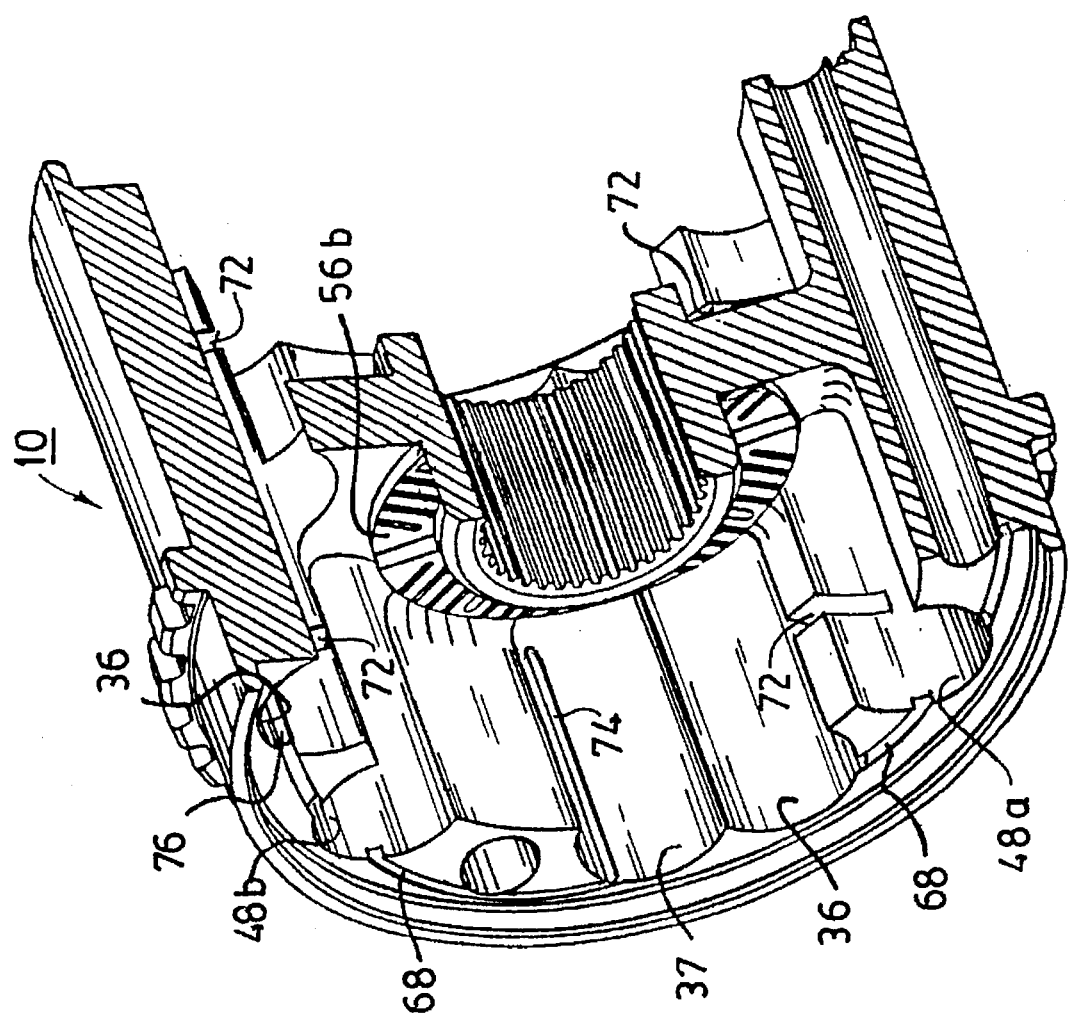

As can best be seen in the perspectives FIGS. 3A and 3B, the invention also includes a plurality of pathways connecting fluid-storage pockets 48a, 48b, and 48c with the pairs of planet-gear pockets 36, 37. These pathways comprise circumferential grooves 68 and inter-pocket holes 70 and slots 72. Circumferential grooves 68 are formed between transverse sections of housing main body 10 and housing end caps 12, 14. While grooves 68 are shown as being formed in all three of these housing sections, economy of manufacture suggests that circumferential grooves 68 should be formed entirely in end caps 12, 14.

At the point where each circumferential groove 68 intersects with a planet-gear pocket 37, it also interconnects with a shallow trough 74 formed in an axial direction along the bearing surface of pocket 37. The primary purpose of circumferential grooves 68 is to deliver stored lubricating fluid from fluid-storage pockets 48a, 48b, and 48c to those portions of the interior surfaces of end caps 12, 14 which serve as thrust surfaces for receiving the end surfaces of planet gears 32, 34 and the end surfaces of side gears 28, 30. However, lubricating fluid delivered along grooves 68 is also distributed to the bearing surfaces of pockets 37 via shallow troughs 74.

Circumferential holes 70 extend between each planet-gear pocket 36 and each fluid-storage pocket 48. At the intersection of each hole 70 and each planet-gear pocket 36, hole 70 also interconnects with further shallow troughs 76 which, like troughs 74, extend axially along the bearing surfaces of the respective planet-gear pocket. In the slightly modified embodiment shown in FIG. 3B, holes 70 have been replaced with relatively deep interpocket slots 7,2. In the same manner as has just been described regarding holes 70, slots 72 deliver lubrication fluid from a storage pocket 48 to a planet-gear pocket 36, and each slot 72 interconnects with a respective shallow trough 76 formed in the bearing surface of planet-gear pocket 36.

The invention's system of storage pockets, holes, grooves, slots, troughs, etc. provides a greater quantity of lubricating fluid within the same sized housing to facilitate lubrication and also to provide greater control over the frictional characteristics of the differential's bearing surfaces, thereby, providing greater control over the torque bias characteristics of the differential.

In addition, the lubricating system of the invention provides means for overcoming undesirable wear that can result in periods of vehicle operation which follow immediately after a period during which the vehicle has been stopped (e.g., parked) for an extended amount of time. It is well-known that during such extensive shut-downs, lubricating fluid is not circulated through the differential, and the fluid that is in the differential at the time its rotation ceases drains to the bottom of the differential housing. In conventional differentials, the amount of lubricating fluid within the differential at any time during operation is quite limited due to the close tolerances between the planetary gear system and its housing. That is, even when all of the lubricating fluid within the differential collects at the bottom of the housing, there is relatively little of it so that when the differential is started up hours or days later, most of the differential is dry and it takes considerable time for the cooler and thicker lubricating fluid to be circulated to these dry areas.

FIG. 2A shows the differential positioned in an orientation in which storage pocket 48a is located near the bottom of the vertical plane 78 passing through common axis 26. It is assumed that the differential has not been rotating for an extended period and that its lubricating fluid has settled to the bottom of main body 10. When the differential is rotating during normal vehicle operation, the lubricant pumped into the differential through bore 50 of first output shaft 22 is centrifugally distributed throughout the differential, substantially filling all three fluid-storage pockets 48. Thereafter, when rotation of the differential ceases, much of this fluid slowly drains through vents (to be described in greater detail below). However, when stopped in the position shown in FIG. 2A, the level of the lubricating fluid settling to the bottom of main body 10 is indicated by lubricant level line 80. In this position, fluid nearly fills storage pocket 48a. Therefore, when the differential begins to operate once again, the rotation of main body 10 quickly distributes this stored lubrication fluid throughout the differential so that the differential does not run dry during the initial start-up period, thereby providing essential lubrication prior to the resumption of normal circulation of fluid entering through bore 50.

Figure 2B:
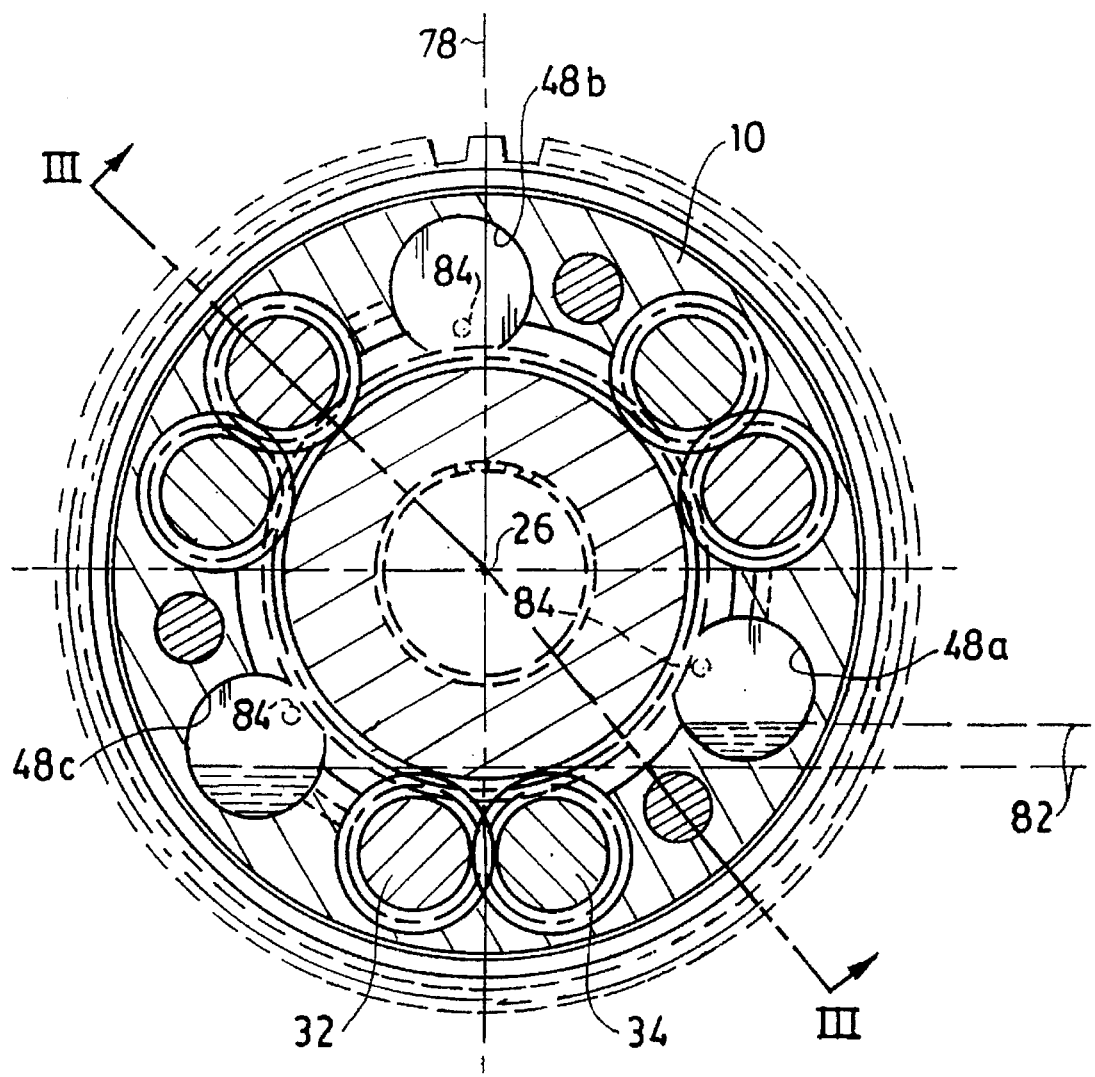

FIG. 2B shows the differential oriented with a planet gear pair 32, 34 positioned near the bottom of vertical plane 78. Again, it is assumed that the vehicle has been standing for some appreciable time and that the level of the lubricating fluid settling to the bottom of main body 10 is indicated by lubricant level line 82. It can be seen that, even in this "worst case" orientation of the housing, some lubricating fluid remains in storage pocket 48a, while even more fluid remains in storage pocket 48c. Therefore, whenever the vehicle comes to a stop, it can be appreciated that the lubrication system of the invention retains lubricating fluid within the differential in an amount approximately equivalent to at least one-half the volumetric capacity of one fluid-storage pocket 48, thereby assuring adequate start-up lubrication for the differential at all times.

Figure 5:
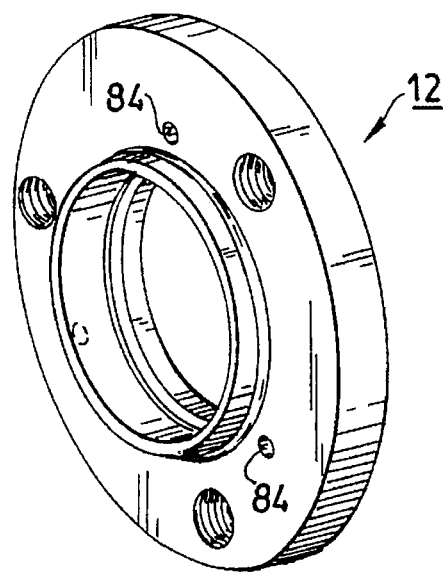
FIG. 5 is a perspective view of one of the end cap portions of the differential housing, showing holes used to vent lubricating fluid from the housing.

A fluid-exit vent controls the volumetric flow of lubricating fluid through the differential during vehicle operation as well as the amount of lubricating fluid stored in pockets 48 when the vehicle is stopped or parked. Namely, the fluid-exit vent determines the rate at which the fluid is allowed to leak from the differential housing back into an appropriate sump, e.g., the casing (not shown) that surrounds the differential of the vehicle. In the preferred embodiment illustrated in the drawings, this vent comprises a plurality of holes 84 formed in end caps 12, 14 (see FIG. 5). Vent holes 84 are positioned at preselected radial distances from common axis 26, and the number and size of vent holes 84 are selected to regulate the volumetric flow, while their preselected radii can be used to determine the level of fluid retention within pockets 48. FIGS. 2A and 2B indicate (in dotted lines) one possible relative radial position for holes 84.

In addition to holes 84, some venting of lubrication fluid occurs through the relatively large clearance left (a) between the journals of side gears 28, 30 and their bearing surfaces formed by interior circumferences 86 and 88 of respective housing end caps 14 and 12, and (b) between output shafts 22, 24 and their bearings 17. Also, in some preferred designs of our differential, the fluid-exit vent is formed only by these just-described clearances.

We claim:

1. A lubricating system for a parallel-axis gear differential having:

first and second output shafts rotatable about a common axis and supported in respective bearings;

a housing rotatable about said common axis and having a main body and two ends with respective openings for receiving said first and second output shafts;

first and second side gears respectively coupled to inner ends of said first and second output shafts within said housing;

planet gears having axes parallel to said common axis and interconnecting said first and second side gears for rotation in opposite directions; and planet-gear pockets formed in said main body and having respective bearing surfaces for rotatively mounting outside diameter surfaces of said planet gears about axes that extend parallel to said common axis;

said lubricating system comprising:

a first passageway for conducting lubricant into said housing;

fluid-storage pockets formed circumferentially in said main body between said planet-gear pockets for storing lubricant within said housing; and said two ends of the housing being closed to retain lubricant within said fluid-storage pockets; and a fluid-exit vent for controlling the flow of lubricant through the differential.

2. The system of claim 1 in which said fluid-storage pockets are distributed around the common axis in positions that maintain the differential in rotational balance.

3. The system of claim 2 in which at least three fluid-storage pockets are formed in said main body.

4. The system of claim 3 in which said fluid-storage pockets are located on said housing so that, in any rotational position of said housing, at least one of said three fluid-storage pockets retains lubricant.

5. The system of claim 1 wherein said first passageway for conducting lubricant into said housing is formed through said first output shaft.

6. The system of claim 5 further comprising a second passageway for conducting lubricant from said first passageway to said fluid-storage pockets.

7. The system of claim 6 wherein said second passageway is formed contiguous with said inner end of said first output shaft and with an inner end face of said first side gear.

8. The system of claim 7 wherein said second passageway further comprises a washer mounted between said first side gear and the main body of said housing, and wherein said washer has two end surfaces with grooves formed radially across the entire width of at least one of said end surfaces.

9. The system of claim 1 wherein said fluid-exit vent is located in one of said housing ends and comprises holes radially aligned with said fluid-storage pockets, said holes being located so that, when the rotation of said housing positions all of said fluid-storage pockets out of alignment with the bottom of the longitudinal vertical plane of said housing, some lubricant will remain stored in at least one of said fluid-storage pockets.

10. The system of claim 1 wherein said fluid-exit vent comprises a pathway formed between said second output shaft and its said respective bearing.

11. The system of claim 1 further comprising a pathway for lubricant connecting at least one said fluid-storage pockets with at least one said planet-gear pockets.

12. The system of claim 11 wherein said pathway comprises at least one hole formed in said main body and extending between said planet-gear and fluid-storage pockets.

13. The system of claim 11 wherein said pathway comprises a groove formed in said main body.

14. The system of claim 11 wherein said planet-gear and fluid-storage pockets are positioned adjacent to each other and said pathway comprises a slot formed transverse said adjacent pockets.

15. The system of claim 14 further comprising a shallow trough formed in said bearing surface of said planet-gear pocket, and wherein said slot intersects said shallow trough.

16. The system of claim 15 wherein said shallow trough extends in an axial direction along the bearing surface of said planet-gear pocket.

17. The system of claim 11 wherein one of said housing ends comprises a separable end cap and said pathway comprises a groove formed between said main body and said end cap.

18. The system of claim 17 wherein said groove is formed in said end cap.

19. The system of claim 1 further comprising an input shaft that extends through said second output shaft into engagement with an extension of said main body of the housing.

20. The system of claim 19 further comprising a second passageway for conducting lubricant from said first passageway to said fluid-storage pockets, said second passageway being formed between an inner end face of said first side gear and said extension of said main body.

21. The system of claim 20 further comprising a third passageway for conducting lubricant from said first passageway to said second output shaft and said second side gear.

22. The system of claim 21 wherein said input shaft is in splined engagement with said extension of said main body of the housing and said third passageway is formed by the removal of at least one spline forming a portion of said splined engagement.

23. The system of claim 1 further comprising a second passageway for conducting lubricant from said first passageway to said fluid-storage pockets, said second passageway including a washer with two end surfaces and having grooves formed radially across the entire width of at least one of said end surfaces to provide passageways for lubricating fluid.

24. The system of claim 23 wherein said washer has four of said radial grooves positioned 90° apart, and wherein said one end surface of said washer is also formed with a plurality of further grooves oriented at 45° to said radial grooves.

25. The system of claim 24 wherein said further grooves are formed across the entire width of said one end surface.

26. A lubricating system for a parallel-axis gear differential comprising:

a pair of output shafts rotatable about a common axis and supported in respective bearings;

a housing rotatable about said common axis and having a main body and two ends with respective openings for receiving said first and second output shafts;

first and second side gears respectively coupled to inner ends of said first and second output shafts within said housing;

planet gears having axes parallel to said common axis and interconnecting said first and second side gears for rotation in opposite directions;

planet-gear pockets formed in said main body and having respective bearing surfaces for rotatively mounting outside diameter surfaces of said planet gears about axes that extend parallel to said common axis;

a first passageway for conducting lubricant into said housing;

fluid-storage pockets formed circumferially in said main body for storing lubricant within said housing;

said two ends of the housing being closed to retain lubricant within said fluid-storage pockets; and vents formed through said two ends for controlling the flow of lubricant through the differential.

27. The system of claim 26 in which said fluid-storage pockets are located on said housing so that, in any rotational position of said housing, at least one of said fluid-storage pockets retains lubricant.

28. The system of claim 26 further comprising a second passageway for conducting lubricant from said first passageway to said fluid-storage pockets.

29. The system of claim 28 wherein a washer is mounted between said first side gear and the main body of said housing and said second passageway further comprises radial grooves in an end surface of said washer.

30. The system of claim 26 wherein said first passageway is formed through said first output shaft, and wherein said vents comprise a pathway formed between said second output shaft and its said respective bearing.

* * * * *